US006826291B2

(12) United States Patent
Yoshiura et al.

(10) Patent No.: US 6,826,291 B2
(45) Date of Patent: Nov. 30, 2004

(54) METHOD AND SYSTEM FOR EMBEDDING INFORMATION INTO CONTENTS

(75) Inventors: Hiroshi Yoshiura, Tokyo (JP); Isao Echizen, Yokohama (JP); Junichi Taguchi, Sagamihara (JP); Akira Maeda, Yokohama (JP); Takao Arai, Yokohama (JP); Toshifumi Takeuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/073,010

(22) Filed: Feb. 12, 2002

(65) Prior Publication Data

US 2002/0076086 A1 Jun. 20, 2002

Related U.S. Application Data

(63) Continuation of application No. 09/144,989, filed on Sep. 1, 1998.

(30) Foreign Application Priority Data

Sep. 3, 1997 (JP) ............................................. 9-238031

(51) Int. Cl.⁷ ............................................... G06K 9/00
(52) U.S. Cl. ....................................... 382/100; 382/274
(58) Field of Search ................................ 382/100, 232, 382/260, 266, 274; 380/54, 287; 283/17, 113, 73; 705/50, 54

(56) References Cited

U.S. PATENT DOCUMENTS

| 5,530,759 A | 6/1996 | Braudaway et al. |
| 5,561,724 A | 10/1996 | Kido et al. |
| 5,568,570 A | 10/1996 | Rabbani ..................... 382/238 |
| 5,606,609 A | 2/1997 | Houser et al. |
| 5,636,292 A | 6/1997 | Rhoads |
| 5,721,788 A | 2/1998 | Powell et al. ................ 382/100 |
| 5,737,417 A | 4/1998 | Buynak et al. |
| 5,748,763 A | 5/1998 | Rhoads |
| 5,778,064 A | 7/1998 | Kori et al. ...................... 380/5 |
| 5,799,111 A | 8/1998 | Guissin ...................... 382/254 |
| 5,822,425 A | 10/1998 | Ezaki et al. |
| 5,848,155 A | 12/1998 | Cox |
| 5,859,920 A | 1/1999 | Daly et al. |
| 5,889,868 A | 3/1999 | Moskowitz et al. |
| 5,896,454 A | 4/1999 | Cookson et al. ............... 380/5 |
| 5,905,819 A | 5/1999 | Daly .......................... 382/284 |
| 5,915,027 A | 6/1999 | Cox et al. ..................... 380/54 |
| 5,930,369 A | 7/1999 | Cox et al. ..................... 380/54 |
| 5,949,055 A | 9/1999 | Fleet et al. .................. 235/469 |
| 5,960,081 A | 9/1999 | Vynne et al. ................. 380/10 |
| 6,005,643 A | 12/1999 | Morimoto |
| 6,061,793 A | 5/2000 | Tewfik et al. ................ 713/176 |

(List continued on next page.)

FOREIGN PATENT DOCUMENTS

| EP | 0581317 | 2/1994 |
| EP | 0612054 | 8/1994 |
| EP | 0651554 | 5/1995 |
| EP | 0766466 | 4/1997 |

(List continued on next page.)

OTHER PUBLICATIONS

Bender et al, Techniques for Data Hiding, IBM Systems Journal, vol. 35, Nos. 3 & 4, 1996, pp. 313–335.

(List continued on next page.)

*Primary Examiner*—Samir Ahmed
(74) *Attorney, Agent, or Firm*—Antonelli, Terry, Stout & Kraus, LLP (57) ABSTRACT

A method of embedding information into contents includes a changeable range calculating step of obtaining a range where value change of the contents is imperceptible to the human being and a step of embedding information by changing the values of the contents within the changeable range.

7 Claims, 10 Drawing Sheets

U.S. PATENT DOCUMENTS

| | | | |
|---|---|---|---|
| 6,069,914 A | 5/2000 | Cox | 375/150 |
| 6,101,602 A | 8/2000 | Fridrich | 713/176 |
| 6,104,826 A | 8/2000 | Nakagawa et al. | 382/100 |
| 6,141,446 A | 10/2000 | Boliek et al. | 382/233 |
| 6,212,325 B1 | 4/2001 | Kori | 386/1 |
| 6,240,121 B1 | 5/2001 | Senoh | 375/130 |
| 6,259,801 B1 | 7/2001 | Wakasu | 382/100 |
| 6,285,775 B1 | 9/2001 | Wu et al. | 382/100 |

FOREIGN PATENT DOCUMENTS

| | | |
|---|---|---|
| EP | 805600 | 11/1997 |
| EP | 840513 | 5/1998 |
| EP | 0901276 | 3/2001 |
| JP | 55133179 | 10/1980 |
| JP | 1222575 | 9/1989 |
| JP | 2162475 | 6/1990 |
| JP | 3193472 | 8/1991 |
| JP | 4188283 | 7/1992 |
| JP | 66329 | 1/1994 |
| JP | 8161483 | 6/1996 |
| JP | 9130766 | 5/1997 |
| JP | 9238031 | 9/1997 |
| JP | 1049669 | 2/1998 |
| JP | 1049670 | 2/1998 |
| JP | 10283471 | 10/1998 |
| WO | 9520291 | 7/1995 |
| WO | 9625005 | 8/1996 |
| WO | 9636163 | 11/1996 |
| WO | 9641468 | 12/1996 |
| WO | 9714249 | 4/1997 |
| WO | 9827510 | 6/1998 |

OTHER PUBLICATIONS

K. Kido, et al "Improvement of MRI Image Quality by a Directional Adaptive Filter", Systems and Computers in Japan, vol. 28, No. 10, 1997, 99–69–76.

Papers of IEICE of Japan, D–II vol. J79–D–II, No. 8, pp. 1347–1353.

JPEG Compression: "Digital Compression and Continuous--Tone Still Images", ISO/IEC/0918–1.

Bors and Pitas: "Image Watermarking using DCT Domain Constraints" Proceeding of 3rd IEEE International Conference on Image Processing, Sep. 16–19, 1996, pp. 231–234.

Nikkei Electronics Feb. 24, 1997 (683) pp. 99–107 "Digital Watermark protects multi–media age".

W. Pennebake et al, "Still Image Data Compression Standard" JPEG, pp. 335–353.

"Data Hiding Technology for Supporting Electronic Water Mark (Upper)", pp. 149–162, Nikkei Electronics Feb. 24, 1997 (No. 683), by Nikkei Business Pub., Inc.

W. Bender, et al "Data Hiding Technology for Supporting Electronic Watermark (Upper)" Nikkei Electronics, No. 683, Feb. 24, 1997, pp. 149–162.

S. Shimizu, et al "Pixel Block Coding for Digital Still Images", IBM Japn, Ltd., Tokyo Research Lab. pp. 257–258.

Nikkei Electronics Feb. 24, 1997 (No. 683), pp. 99–107.

The Institute of Electronics, Information and Communication Engineers, D–II, vol. J79–D–II, No. 8, pp. 1347–1353, Aug., 1996.

The Information and Systems Society, vol. J80–D–II, No. 9, Sep. 1997, pp. 2345–2350.

G. Caronni, "Assuring Ownership Rights for Digital Images" Published in the proceedings of 'reliable IT systems' VIS '95, edited by Brueggemann, H.H and Gerhardt–Haeckl, W. Vieweg Publishing Company, Germany 1995, pp. 1–10.

O. Ruanaidh, "Watermarking digital images for copyright protection" IEEE Proceedings on Vision, Signal and Image Processing, vol. 143, No. 4, 1996, pp. 250–256.

METHOD AND SYSTEM FOR EMBEDDING INFORMATION INTO CONTENTS

CROSS-REFERENCED TO RELATED APPLICATION

This application is a continuation of application Ser. No. 09/144,989, filed Sep. 1, 1998 and relates to U.S. patent application Ser. No. 09/144,696, filed on Sep. 1, 1998 and U.S. patent application Ser. No. 09/148,325 filed on Sep. 4, 1998, and assigned to the present assignee. The contents of these applications are incorporated herein by reference.

BACKGROUND OF THE INVENTION

The invention relates to a method, apparatus and computer program for embedding arbitrary information into contents and, more particularly, to a method, apparatus and computer program for embedding information into contents without degrading the contents.

Although techniques for embedding information into contents have been developed with respect to various contents (namely, digitized data) such as images, audio signal, text, drawings, and the like, an information embedding to an image will now be mentioned here as a typical example. Generally, for example, as disclosed in IBM System Journal, Vol. 35, No. 3 & 4, pages 313–336, 1996, according to the information embedding technique into an image, information is embedded by adding a slight change to a value such as an intensity or the like of a pixel.

There are the following requests from a viewpoint of the practical use with respect to such a value change.

(1) The change in value cannot be detected by the human sight (or, even if it can be detected, this does not become an obstacle of the image reference of the human being).

(2) Even if a process such as a JPEG compression or the like is performed to an image in which information has been embedded, the embedded information is not extinguished.

According to the conventional information embedding technique, as disclosed in the above literature, some devices have been made with respect to the kind of value as a target of the change in order to satisfy the requirement. That is, a change is added to the value so that the change is inconspicuous and is hard to be extinguished. For example, the image is expressed by a frequency value and a change is added to coefficients of middle-range values.

The relation between the change in value of the actual image and the change recognized by human sight differs every image and, further, depending on a region in the image. For example, although even a slight value change is conspicuous in a flat region, even a large change in value is inconspicuous in a jumble region such as a forest photograph.

According to the above conventional techniques, however, it is insufficient with respect to a point of optimizing a size of value change in dependence on the nature of the image. In case of giving a priority to the prevention of the visual change, therefore, it is necessary to reduce the value change by presuming a case of a flat image and a survivability to the image process is small. In case of giving a priority to the survivability to the image process, on the other hand, it is necessary to increase the value change and a visual change occurs in a flat image. That is, according to the conventional system, it is difficult to accomplish both of the prevention of the visual change and the improvement of the survivability to the image process.

SUMMARY OF THE INVENTION

It is an object of the invention to provide a method of embedding information into contents, wherein both of a prevention of a visual change and the improvement of a survivability to an image process can be accomplished and to provide a program to realize such a method and an apparatus for executing such method and computer program.

In the field of medical image processes, a 15 filter to make a diagnosis of a doctor easy for a human photograph photographed by using an X-ray or an MRI is being studied. The most advanced medical filter has the following nature as disclosed in the papers of The Institute of Electronics Information and Communication Engineers of Japan, D-II, Vol. J79-D-II, No. 8, pages 1347–1353.

(1) Noises are removed by a smoothing process.

(2) The shape is preserved with respect to edge information that is important to the human sight, namely, a portion where the nature of an outline or plane of an object changes and a point (singular point) where the color or brightness is particularly different as compared with that of the ambient portion.

When considering from another viewpoint, it is possible to consider that the medical filter has the following nature.

(1) The value of the image changes.

(2) The image does not visually change. Or, even if it changes, it does not become an obstacle of the human reference.

The above described problems are solved by using the features of the medical filter mentioned above. That is, the above problems can be solved by an information processing system having means for inputting contents and means for embedding information into the contents, wherein a value change of the contents which is imperceptible to the human being or which does not become an obstacle of the reference of the contents of the human being is performed by using the medical filter mentioned above, a region between the value before the change and the value after the change is set to a changeable range of the value in the information embedding, and the information is embedded by changing the value of the contents within the changeable range.

DESCRIPTION OF THE PREFERRED EMBODIMENTS

A fundamental portion of an embodiment of the invention will now be described hereinbelow with reference to FIGS. 1 and 2. In the embodiment, it is assumed that a still image is used as a target and information is embedded by changing an intensity of a pixel.

Figure 1:
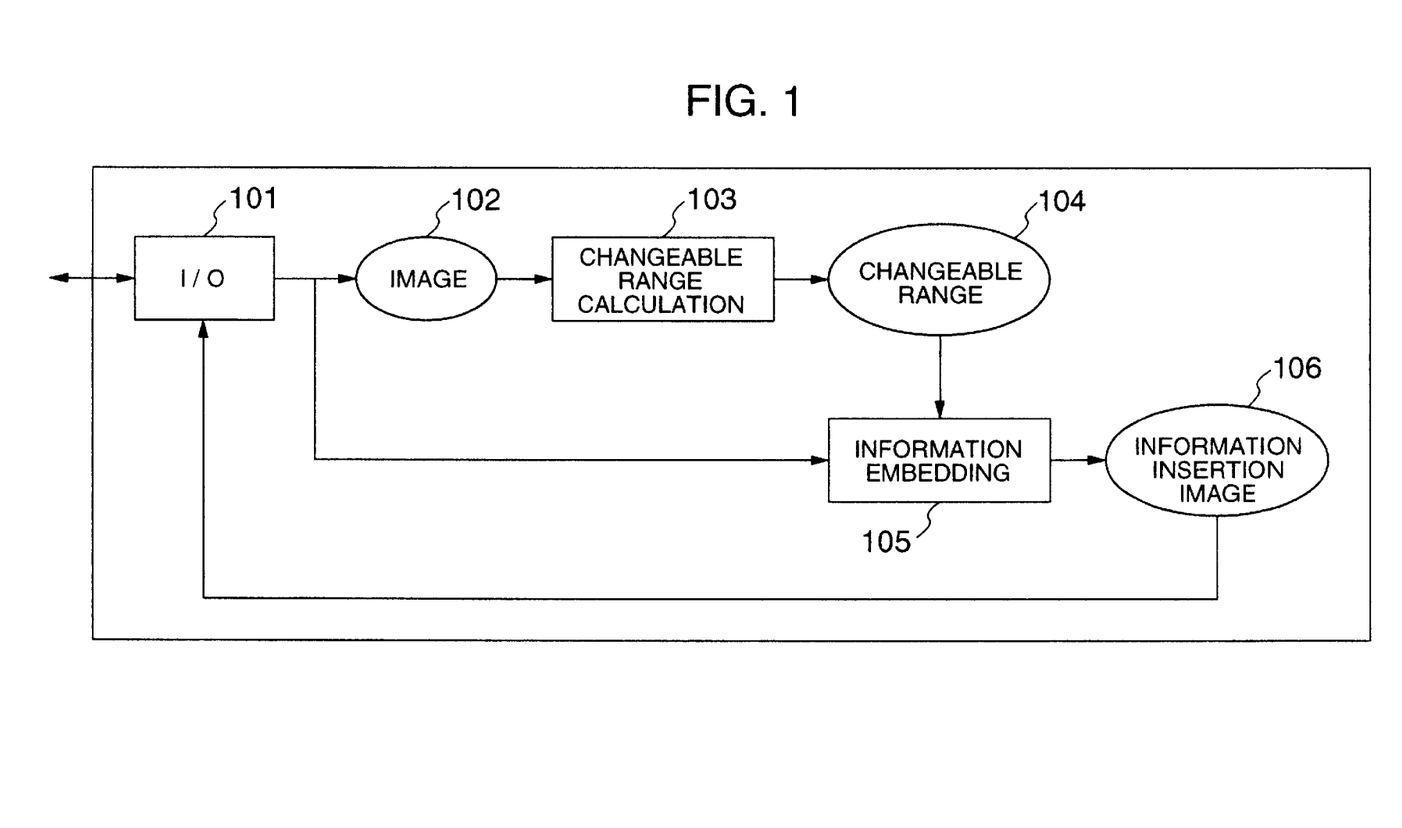
FIG. 1 is a functional constructional diagram according to the present invention.
Figure 2:
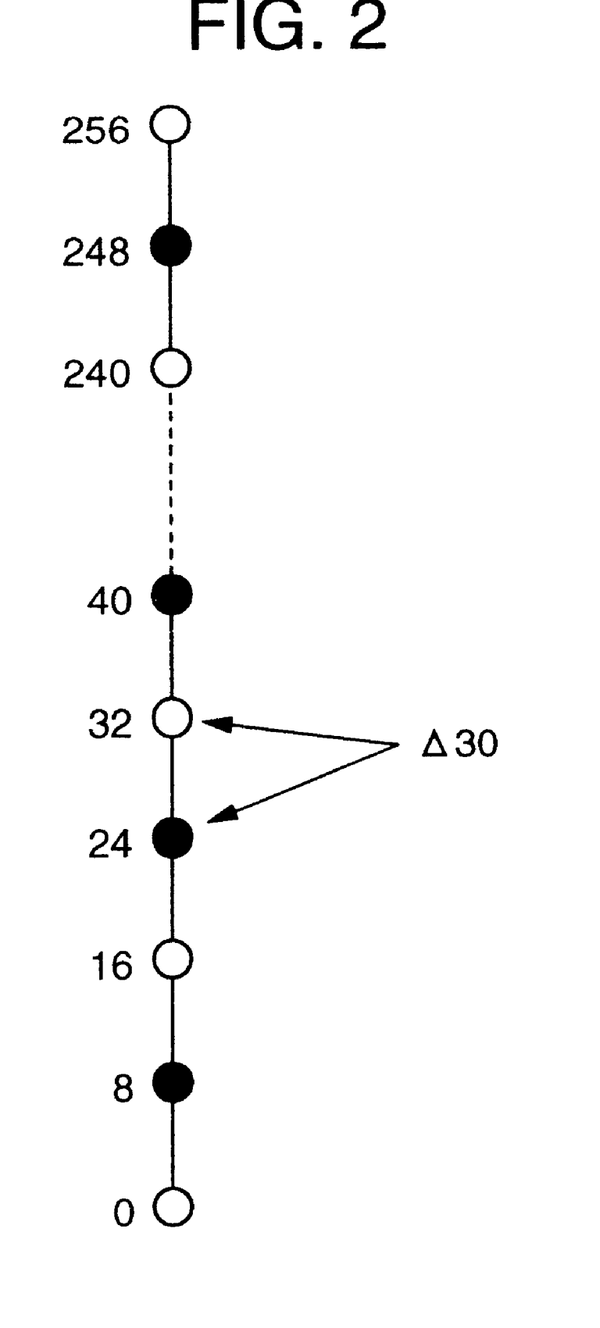
FIG. 2 is a diagram for explaining a pixel intensity changing method according to the present invention.

FIG. 1 is a functional constructional diagram according to the invention. Elements shown by rectangles, namely, an input/output 101, a changeable range calculation 103, and an information embedding 105 denote processes and are realized by a CPU of a computer. Elements shown by ellipse, namely, an image 102, a changeable range 104, and a watermark inserted image 106 denote data and are realized by a storing apparatus of the computer.

Hereinbelow, something which is obtained by making information correspond to some pattern which is imperceptible to the human being is called a "watermark" and an image in which information has been embedded is called a "watermark inserted image".

The inputting/outputting process 101 inputs an image and stores it into a storing apparatus. In the changeable range calculating process 103, the foregoing medical filter or an image process similar thereto is first applied to the image data 102. Thus, an image in which an intensity is different from that of the image data 102 and which is visually similar to it is obtained. In the changeable range calculating process 103, subsequently, the intensity before the image process is applied and the intensity after it was applied are stored every pixel. This is the changeable range data 104.

In the information embedding process 105, pixels whose intensities are changed are selected from among pixels of the image data 102. Subsequently, with respect to each of the selected pixels, by changing the intensity to a specific value, the information is embedded. Thus, the information insertion image data 106 is obtained. The information insertion image data 106 is outputted to the outside through the inputting/outputting process 101.

An outline of the above medical filter is as follows.

(1) With regard to each pixel in the image, the processes (2) and (3) are executed.

The "pixel" denotes the minimum partial image constructing the image and is generally expressed by the intensity and two kinds of color differences or by three kinds of colors (three primary colors). It is now assumed that the pixel is constructed by the intensity and the color differences.

(2) The intensities of the relevant pixel and its peripheral pixel are analyzed, thereby obtaining a normal vector of the intensity in the relevant pixel. This vector shows the direction in which the change of the intensity is the maximum. A vector which perpendicularly crosses the above vector and passes through the relevant pixel indicates the direction in which the change of the intensity is the minimum, namely, an edge which passes through the relevant pixel.

(3) A one-dimensional smoothing process is executed along the above edge.

By the above process, the medical filter has the foregoing nature.

In the changeable range calculating process 103, an image in which an intensity differs from that of the image data 102 and which is visually similar to it is obtained.

A changing method of the intensity in the information embedding process 105 will now be described with reference to FIG. 2. It is now assumed that a value of the intensity of one pixel lies within a range of 0 to 255. FIG. 2 shows the intensity value of the pixel by a number line. In the embodiment, a white circle on the number line, namely, a point in which the value is a multiple of "16" corresponds to the embedding information "0". A black point, namely, a point in which the value is equal to (multiple of "16"+8) corresponds to embedding information "1".

In the information embedding process 105, information is inserted by changing the intensity of the pixel of the image data 102 to the nearest white or black circle. That is, when the information to be embedded into the pixel is equal to "0", the intensity is changed to the white circle. When it is equal to "1", the intensity is changed to the black circle. For example, in the case where the intensity of the pixel is equal to $\Delta$, namely, 30 in the diagram and the information to be embedded is equal to "0", the intensity of the pixel is changed to 32. When the information to be embedded is equal to "1", the intensity is changed to 24.

The use of the changeable range data 104 will now be described. In the above fundamental operation, there is a case where since the change in intensity of the pixel is too large, the image is visually changed. To prevent such a situation, the value of the pixel is changed within the range of the changeable range data 104. For example, it is now assumed that the intensity of the pixel is equal to $\Delta$, namely, 30 and the changeable range of the intensity of the pixel lies within a range of 26 to 33. In this case, when the information to be embedded is equal to "0", the intensity of the pixel is changed to 32 in accordance with the above fundamental operation. However, when the information to be embedded is equal to "1", since the intensity 24 of the change destination side is not included in the changeable range, the intensity is changed to 26 as a value that is the nearest to 24.

Finally, the extraction of information from the watermark inserted image data 106 will now be described. A pixel whose value should be referred is first selected. In the selection of the pixel, the same rule as the pixel selecting rule in the information embedding process 105 is used. Therefore, the pixels whose intensities were changed are selected. Subsequently, with respect to each of the selected pixels, the intensity is extracted and whether the embedded information is equal to 0 or 1 is discriminated by checking to which one of the multiple of 16 and (the multiple of 16+8) the intensity value is closer.

As mentioned above, in the information embedding process 105, since the intensity is changed in the changeable range data 104, there is a case where the intensity cannot be accurately changed to the multiple of 16 or (the multiple of 16+8). Therefore, an error occurs at a predetermined probability in the extraction of the information. This problem can be solved by overlappingly embedding the same information into a plurality of pixels and performing a majority decision in the extraction.

According to the embodiment as mentioned above, the information is embedded into the image and the embedded information can be extracted. In the information embedding, the value of the image can be changed only in a range where it is guaranteed that there is no visual deterioration of the image, namely, only in the changeable range. Since the changeable range is calculated every pixel, by changing the value as much as possible every pixel, the survivability to the image process can be enhanced.

According to the embodiment, in the system for embedding information into a still image by changing the intensity value, the intensity value change range where there is no visual deterioration is obtained every pixel and the intensity value can be changed within such a range. Thus, the visual deterioration of the image as in case of uniformly largely changing the intensity does not occur. A situation such that the inserted information is easily removed as in case of uniformly changing the intensity to a small value does not occur. Both of the prevention of the picture quality deterioration and the survivability of the embedded information can be accomplished.

An embodiment in case of applying the invention to a more practical apparatus will now be described with reference to FIGS. 3 to 5.

The invention intends to optimize a change amount of a value in the case where the value of the image is changed and information is inserted. The invention can be combined to arbitrary image, image value, information kind, and expressing method without depending on the kind of image, kind of pixel value to be changed, kind of information to be inserted, and expressing method of inserting information in the image. The following case will now be considered as an example.

(1) Kind of Image

Motion image data will now be considered. The motion image data comprises 30 still images per second. Each still image consists of 720×480 pixels. In the embodiment, the still images are extracted one by one from the motion image data and information is inserted therein. The information inserting process is completed every still image.

(2) Value of Image to be Changed

The intensity value of each pixel of the still image is changed.

(3) Information to be Inserted

Information of 6 bits, namely, 64 kinds of numerals of 0 to 63.

(4) Expression of Information in Still Image (a) Selection of Block

The still image is divided on a unit basis of a block of 8×8 pixels.

In case of the still image of 720×480 pixels which is frequently used in the contents, the still image is divided into 90×60 (=5400) blocks.

With respect to each of the 64 kinds (6 bits) of inserting information, the block is selected on the basis of a correspondence relation (which has been predetermined and is preserved in, for example, a table) with respect to the value of which (at least one) block among the 5400 blocks is changed. The intensities of the pixels in the selected block are changed.

(b) Change of Intensity in the Block

The intensity of each pixel is changed so that the sum of the intensities of 64 pixels in the selected block is equal to a value which is n times as large as a nearest integer A. Although A denotes the value which is designated by the user of the embodiment, 512 is used here.

When information is extracted, the still images are extracted one by one from the motion image in which the information has been inserted and the information is extracted from each still image.

After the information was embedded by the foregoing method, if an image process such as compression or the like is executed, there is a case where the intensity changes and the intensity sum is not equal to the value that is just n times as large as the integer A at the time of extraction. In the information extraction from the still image, therefore, whether the intensity sum is equal to the value which is n times as large as A or a value near such a value or not is discriminated with respect to each of 5400 blocks.

The term "near" is now defined such that the intensity sum is equal to or larger than $(A \times n - A/4)$ and is equal to or less than $(A \times n + A/4)$. This definition is an example and another definition is also possible.

If the image process such as compression or the like is not performed to the image in which the information has been embedded and no intensity change occurs, there is no need to define "near".

When the intensity sum is equal to the value 25 that is n times as large as A or a value near such a value, it is determined that the intensity of the block has been changed. One of the inserted 64 kinds of information is specified by using the information indicating the intensity of which one of the 5400 blocks has been changed and the foregoing correspondence relation. In the above extraction, if the intensity sum of the block is equal to the value which is n times as large as A by accident in spite of a fact that the intensity is not changed, this becomes a cause of an erroneous detection.

To prevent it, the number of intensity changing blocks is set to a plural number and when the number of blocks in each of which the intensity sum of the block is equal to the value that is n times as large as A or a value near such a value is equal to or larger than a predetermined value (for example, the half) by using the majority decision logic, it is determined that the watermark has been embedded.

As information expressing, inserting, and extracting methods mentioned in the embodiment of the invention, there is a U.S. patent application Ser. No. 09/144,467, filed on Sep. 1, 1998 corresponding thereto, and the disclosure of which is hereby incorporated by reference.

A method of optimizing the intensity change amount will now be mentioned hereinbelow on the assumption of the above information expressing, inserting, and extracting methods as a prerequisite.

Figure 11:
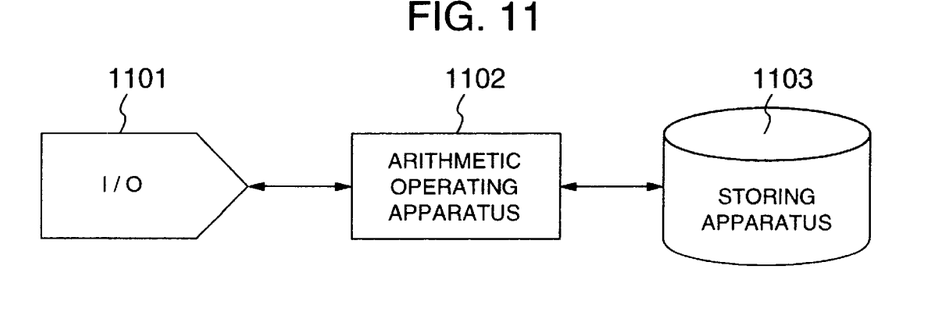
FIG. 11 is a hardware structure of an information embedding system.

FIG. 11 is a hardware constructional diagram of the embodiment. An inputting/outputting apparatus 1101 is realized by an I/O apparatus or the like of a computer. A motion image and information to be embedded are inputted to the outside and stored into a storing apparatus 1103 through an arithmetic operating apparatus 1102. The motion image in which the information has been embedded is received from the arithmetic operating apparatus 1102 and outputted to the outside. The arithmetic operating apparatus 1102 is realized by a CPU of the computer, reads out the motion image and the information to be inserted which have been stored in the storing apparatus 1103, inserts the information into the motion image, and outputs the resultant motion image to the inputting/outputting apparatus 1101. In this instance, the information is embedded by using the above-described filter so as not to visually deteriorate the image. The storing apparatus 1103 is realized by a semiconductor, a hard disk, an optical disk, or the like and stores the motion image and information to be inserted.

Figure 3:
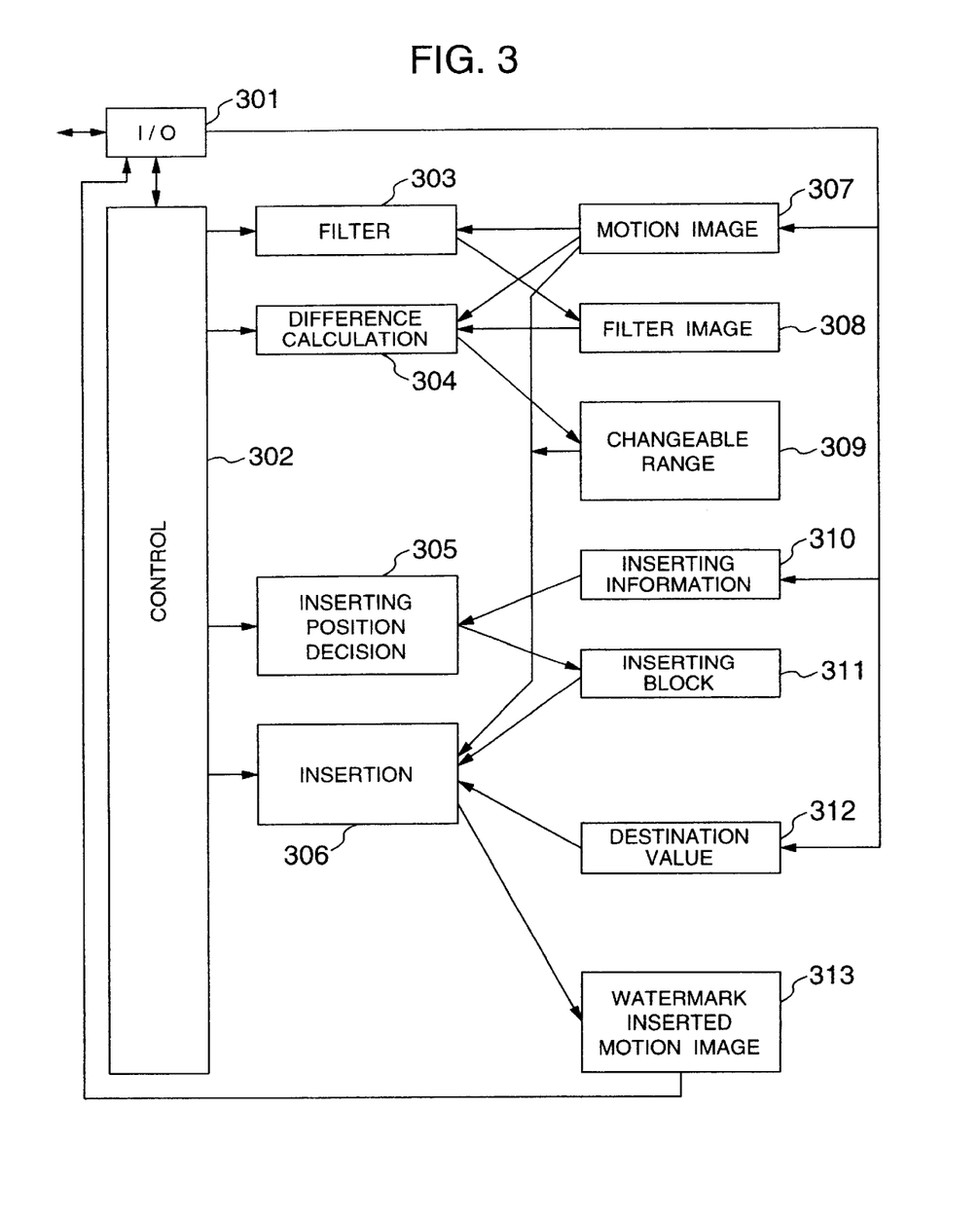
FIG. 3 is a functional block diagram of an information embedding system of the first embodiment.

FIG. 3 is a functional constructional diagram of the embodiment.

Blocks 301 to 306 denote processes which are executed by the arithmetic operating apparatus 1102 and are realized by executing a program by the CPU of the computer. Blocks 307 to 313 indicate data which are stored into a memory, namely, the storing apparatus 1103 of the computer.

The program can be distributed in a state where it has been recorded in a storage medium or can be distributed from a server via a network.

The program can be also constructed so as to operate on the basis of an operating system of a personal computer.

An input/output 301 inputs motion image data 307 and stores into the memory. The motion image data is a train of a plurality of continuous still images. Each still image consists of 720×480 pixels.

The input/output 301 inputs information 310 to be inserted into the image and stores into the memory. The information to be inserted is 6-bit information. That is, the number of information to be inserted is equal to 64 (=$2^6$) kinds.

Further, the input/output 301 inputs a value (the foregoing integer A) 312 serving as a reference when the information is inserted into the image from the inputting/outputting apparatus 1101 and stores into the memory. It is now assumed that the value of the integer A is set to 512. The value which is n times as large as the integer A is hereinafter called a destination value.

The input/output 301 reads out a motion image 313 in which watermark information has been inserted from the memory and outputs from the inputting/outputting apparatus 1101 to the outside.

A control 302 activates a filter 303, a difference calculation 304, an inserting position decision 305, and an insertion 306 for every still image in the motion image 307 and embeds the inserting information 310.

The filter 303 is the medical filter in the embodiment described above. The still images in the motion image 307 are read out one by one, the foregoing filtering process is applied to the read-out still images, and a resultant filter image 308 is stored into the memory.

The difference calculation 304 obtains a difference between the intensities of one still image in the motion image 307 and the filter image 308 obtained therefrom every pixel and stores a resultant value as a changeable range 309 into the memory. The changeable range 309 denotes a range where the intensity can be changed with respect to each pixel of one still image in the motion image 307.

The inserting position decision 305 divides the still image of 720×480 pixels into blocks each consisting of 8×8 pixels, so that 5400 (=90×60) blocks are obtained. The block whose pixel value is changed is selected in correspondence to the inserting information 310 by the above method and is used as an inserting block 311.

The insertion 306 changes the sum of the intensities so as to become the destination value 312 (the value which is n times as large as the integer A) with regard to each block of the inserting block 311. Thus, one still image in which the information has been inserted is obtained and added to the watermark inserted motion image 313.

Figure 4:
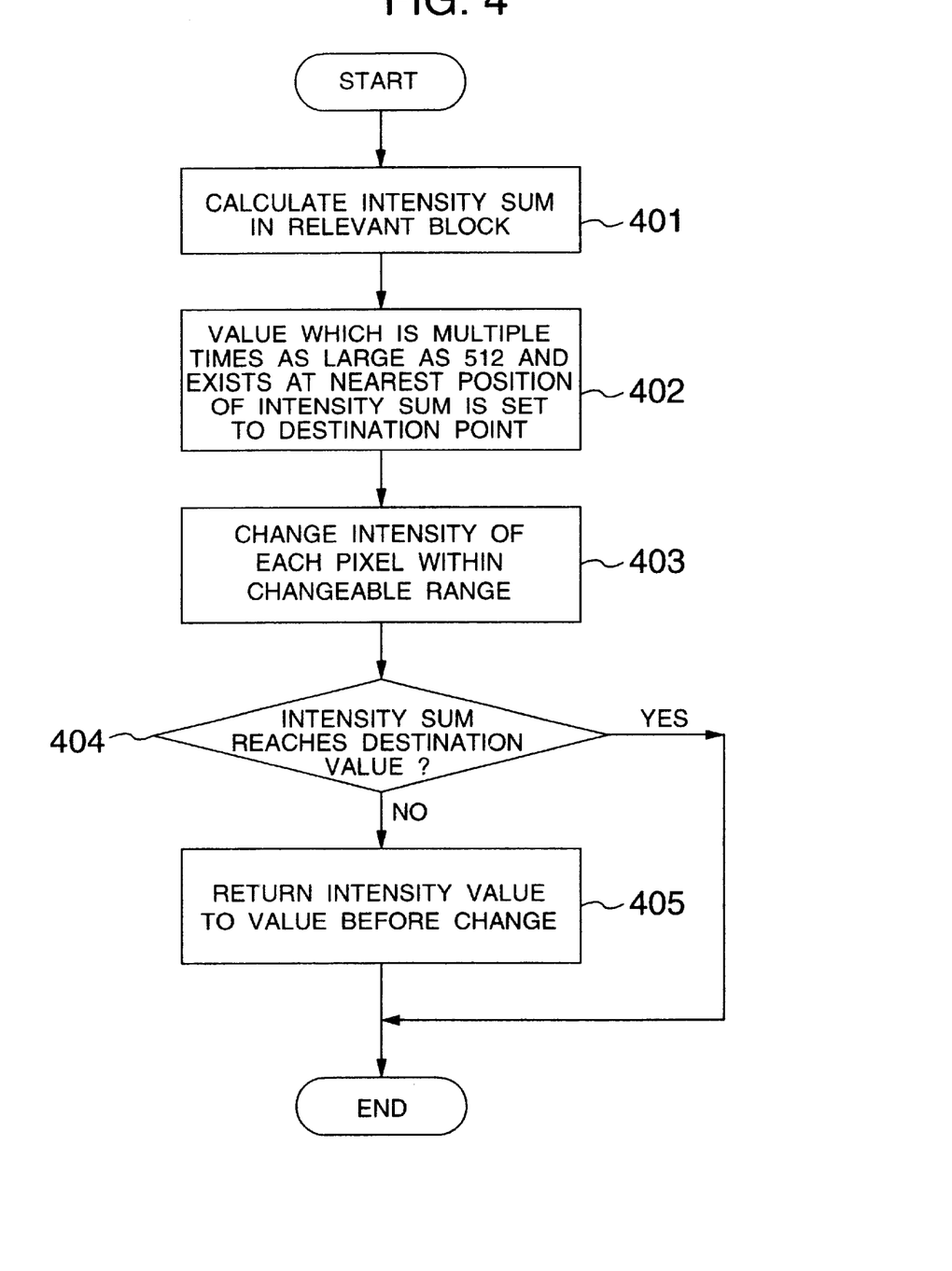
FIG. 4 is a flowchart for explaining the operation of the insertion process 306 in FIG. 3.

FIG. 4 is a flowchart for the operation of the insertion 306. First in step 401, the sum of the intensities of the (8×8)-pixel block 311 as a target is calculated. In step 402, the value which is n times as large as 512 and is nearest to the intensity sum calculated in step 401 is used as a destination value.

Processes in step 403 and subsequent steps are actual inserting processes. First in step 403, the intensity of each pixel in the target block is changed within the changeable range 309 and the intensity sum is also simultaneously changed. In step 404, a check is made to see if the intensity sum after the change coincides with the destination value. When they coincide, the inserting operation is finished. When they don't coincide, the intensity value of the block is returned to the value before the change (namely, no watermark is inserted in the block) and, after that, the inserting operation is finished.

Figure 5:
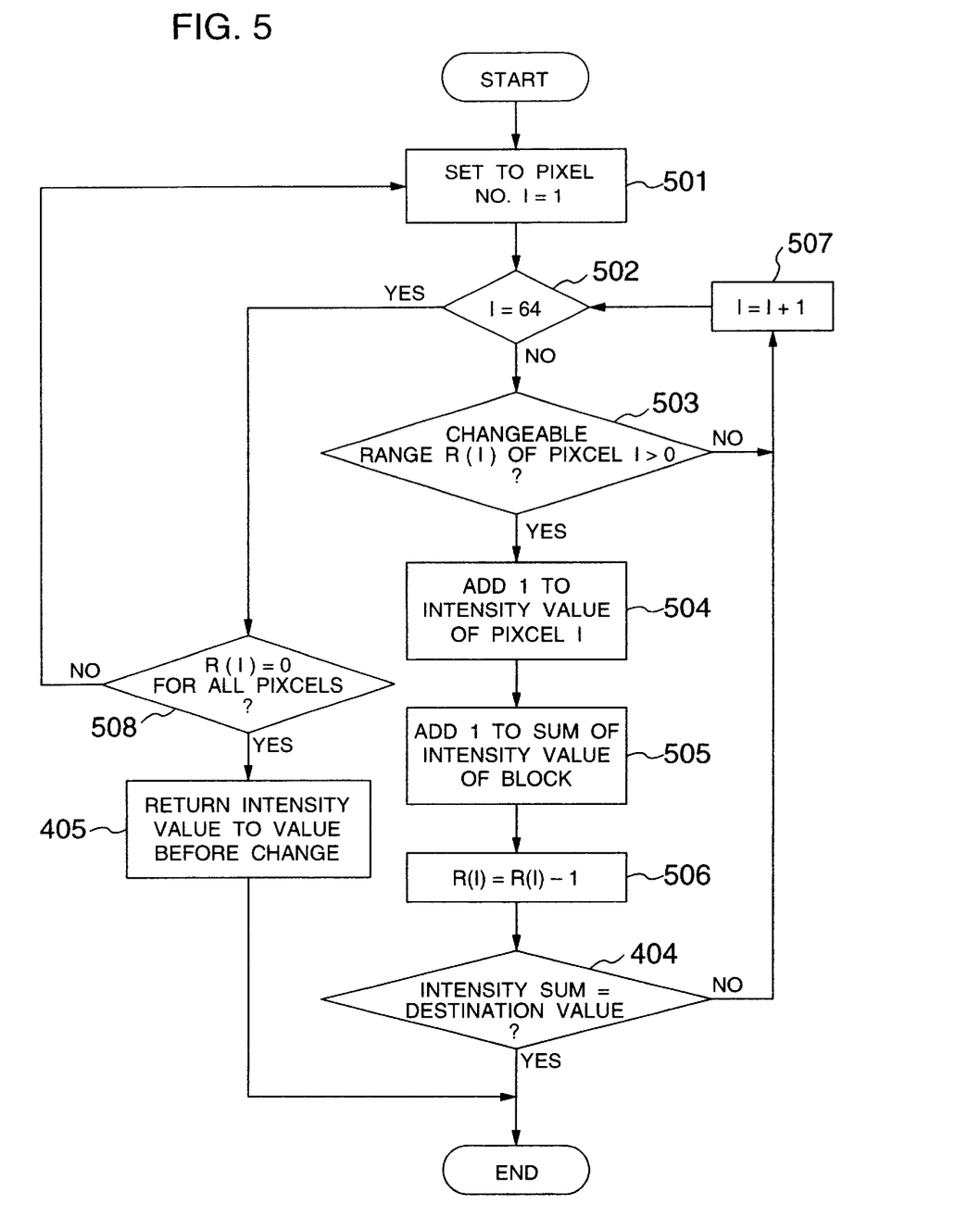
FIG. 5 is a detail flowchart for explaining the insertion process 306 in FIG. 3.

FIG. 5 is a detailed flowchart for the inserting process. A case where the sum of the intensity values before the change is smaller than the destination value will now be considered for simplicity of explanation. It is assumed that the pixels in each block are expressed by the pixel numbers 1 to 64.

First in step 501, the pixel number I is set to 1. Step 502 denotes a discriminating process of the pixel No. I=64 and will be explained hereinlater. In step 503, now assuming that the changeable range 309 of the pixel I is labeled as R(I), a check is made to see if R(I) is positive. That is, whether it can be added to the intensity value of the pixel I or not is discriminated. If it cannot be added, the value of I is increased in step 507 and the processing routine advances to the discriminating process in step 502. If it can be added, the processing routine advances to step 504 and subsequent steps.

In step 504, only "1" is added to the intensity value of the pixel I. In step 505, only "1" is added to the sum of the intensity values of the target block to which the pixel I belongs. In step 506, "1" is subtracted from the value of the changeable range R(I) by the addition of the pixel I.

Step 404 denotes the foregoing discriminating process. If the sum of the intensity values is equal to the destination value, it is regarded that the watermark has been inserted in the target block, and the processing routine is finished. If they are not equal, the value of the pixel number I is increased and step 502 follows.

Step 502 denotes a discriminating process of the pixel No. I=64. I=64 is decided in the following two cases.

(1) A case where among 64 pixels in the target block, although the adding process as once executed as for the changeable pixel, there are still some other pixels in which the intensity value can be changed.

In this case, since R(I) is not equal to 0 among some pixels in step 508, step 501 follows and the adding process of the intensity value is again executed.

(2) Among 64 pixels in the target block, the adding process is executed a plurality of number of times with respect to the changeable pixels. Thus, the change of the intensity value becomes impossible among all of the pixels before the sum of the intensity values reaches the destination value.

In this case, since R(I)=0 among all of the pixels in step 508, step 405 follows and the intensity value of each pixel is returned to the value before the change. The processing routine is finished without inserting a watermark.

According to the embodiment, in the system for embedding the information into the motion image by changing the intensity, both of the prevention of the picture quality deterioration and the survivability of the embedded information can be accomplished by a reason similar to that in the foregoing embodiment.

A method of using more detailed parameters at the time of insertion of a watermark will now be described with reference to FIGS. 6 and 7.

As for the kind of image, the kind of inserting information, and the like, an expressing method similar to that of the embodiment which has already been described is used.

Figure 6:
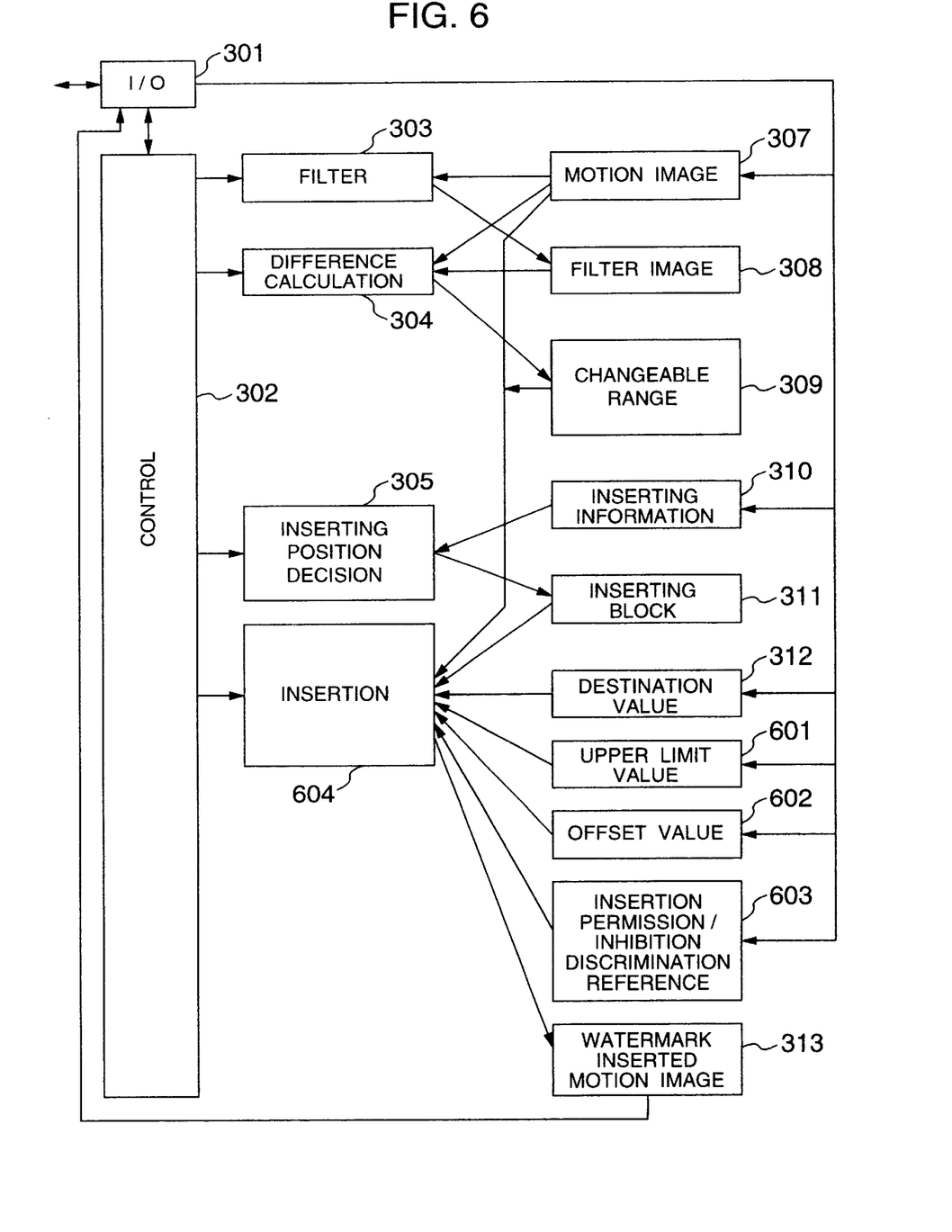
FIG. 6 is a functional block diagram of an 10 information embedding system of the second embodiment.

FIG. 6 is a functional constructional diagram of the embodiment. Data 601 to 603 as parameters at the time of insertion of information and an inserting process 604 which are different from those in the functional constructional diagram of FIG. 3 will now be described.

An upper limit value 601 is a parameter to decide the upper limit of the changeable range 309 and inhibits the change of the intensity value of the upper limit value or more in the insertion 604.

The upper limit value 601 is used, for example, under the AND condition with the changeable range 309 outputted by the filter 303. The upper limit of the changeable range is used when the operator wants to designate by another condition.

An offset value 602 sets the upper limit value in which the intensity value can be changed and indicates the upper limit value in the case where the operator wants to change the intensity value to a value over the changeable range 309 outputted by the filter 303.

An insertion permission/inhibition discrimination reference 603 indicates a discrimination reference which is used at the time of insertion other than the above case. For example, by checking a dispersive value of the intensity of the block, a degree of flatness of the block can be discriminated. A process such that no watermark is inserted into a portion which is too flat in terms of an image in the insertion 604 can be performed.

Figure 7:
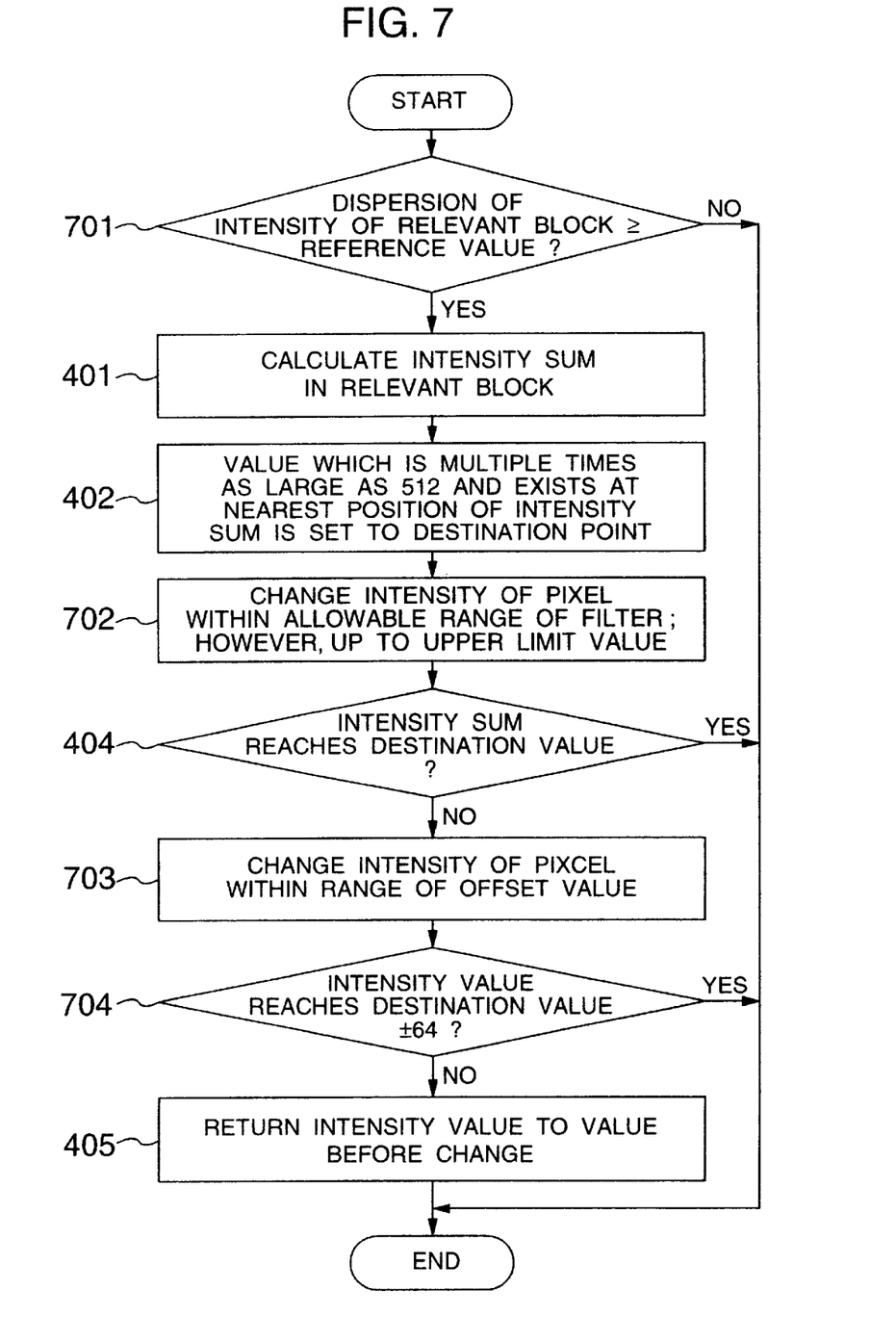
FIG. 7 is a flowchart for explaining the operation of the insertion process 604 in FIG. 6.

FIG. 7 is a flowchart for the operation of the insertion 604 in the embodiment. Since processes other than steps 701 to 704 are similar to those in FIG. 4, their descriptions are omitted.

In step 701, whether the dispersion of the intensities of the relevant block is equal to or larger than a reference value or not is discriminated as an insertion permission/inhibition discrimination reference. If it is less than the reference value, the processing routine is finished. If it is equal to or larger than the reference value, the processing routine advances to step 702 through steps 401 and 402.

In step 702, the intensity, value of the pixel in the target block is changed within the range permitted by the filter. However, the change of the upper limit value 601 or more is not permitted. When the intensity sum does not reach the destination value in step 404, the intensity of the pixel is again changed within the range of the offset value 602 in step 703. Step 704 follows.

In step 704, a check is made to see if the sum of the changed intensity values has reached the destination value or a value (destination value ±64) near the destination value. If it reached, the watermark insertion is completed and the processing routine is finished. If it does not reach, step 405 follows and the processing routine is finished without performing the watermark insertion (by returning the intensity value of the pixel to the value before the change).

According to the method shown in FIGS. 6 and 7, since the intensity changing method without picture quality deterioration in the foregoing embodiment can be further made fine, the preventing effect of the picture quality deterioration is enhanced.

In a motion image or the like, if the intensity sum of the selected block is made coincide with the destination value irrespective of the difference from the destination value (the value that is n times as large as 512), there is a situation such that in case of reproducing the motion image in a real-time manner or the like, flickering occurs on the screen due to a sudden change of the intensity value' or the like and the watermark position is visually conspicuous.

Therefore, a method of making the inserting information further inconspicuous will now be described with reference to FIG. 8.

Figure 8:
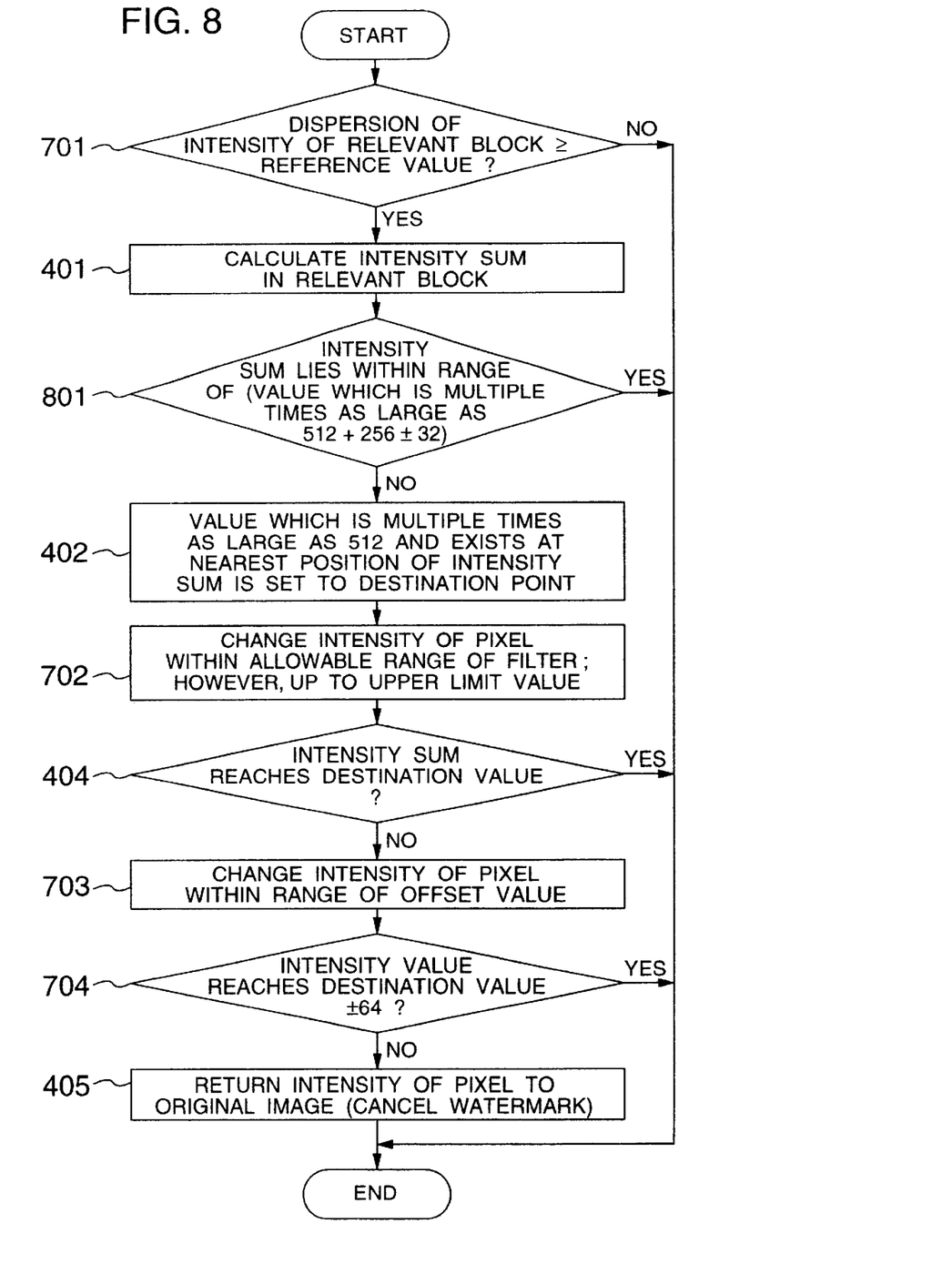
FIG. 8 is a flowchart of another insertion process.

FIG. 8 shows step 801 which is executed between steps 401 and 402 in the flowcharts of FIGS. 4 and 7. Since processes other than step 801 are similar to those in FIGS. 4 and 7, their descriptions are omitted here.

In step 801, in accordance with a preset second upper limit value (not shown) of a difference between the intensity sum before the change of the block and the destination value, the block is discriminated, thereby deciding whether the watermark is inserted or not. Now, assuming that the second upper limit value is set to 32, the block in which the intensity sum does not lie within the following range is used as a target of the actual watermark insertion. In other words, there is used an idea such that when the intensity sum lies within the following range, if the watermark is inserted, the difference from the original intensity sum increases and the watermark insertion is conspicuous, so that the watermark is not inserted.

Value of n times of 512+256−32
<intensity sum
<value of n times of 512+256+32

In this expression, 512 denotes the foregoing integer A and 256 indicates A/2. The second upper limit value is set from the inputting/outputting apparatus 1101 and stored in the storing apparatus 1103.

The watermark insertion is not performed to the block within the above range and the processes are finished.

According to this method, with regard to the block in which the difference between the intensity sum and the destination value is large, since the watermark is not inserted, in case of reproducing the motion image in a real-time manner, the inserting information can be further made inconspicuous. Therefore, the preventing effect of the picture quality deterioration is further enhanced.

Still another embodiment of the invention will now be described with reference to FIGS. 9 and 10.

Figure 9:
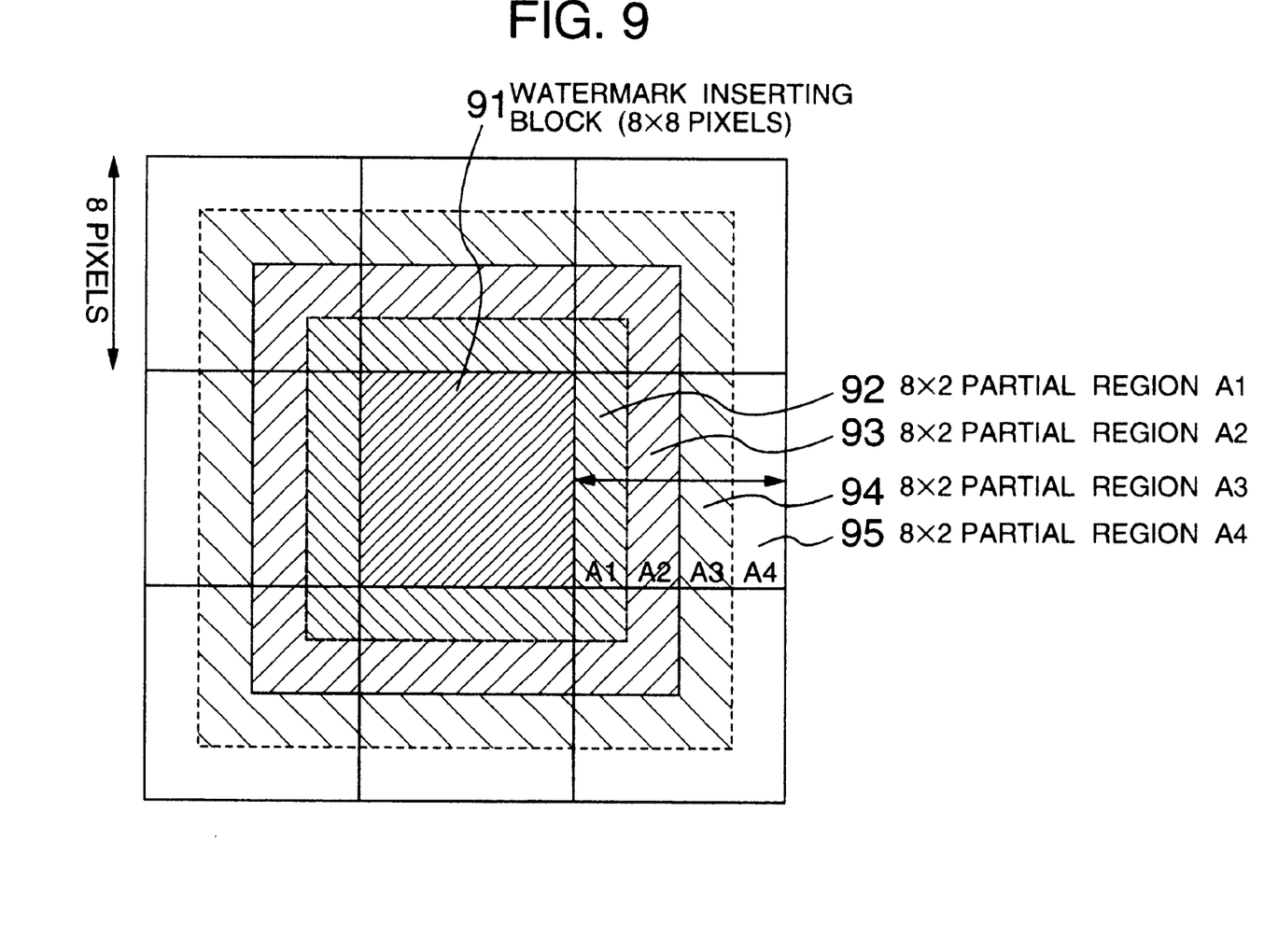
FIG. 9 is a schematic diagram of a watermark inserting block.

FIG. 9 is a schematic diagram of a watermark inserting block using the system of the embodiment. Since the intensity value of a watermark inserting block 91 is changed by the insertion of the watermark, there is a case where the block is conspicuous at a portion of a flat image or the like. As shown in FIG. 9, by forming four regions 92 to 95 around the watermark inserting block 91 and changing the intensity values of the four regions step by step in accordance with the intensity change of the block 91, the watermark inserting block can be made inconspicuous.

Figure 10:
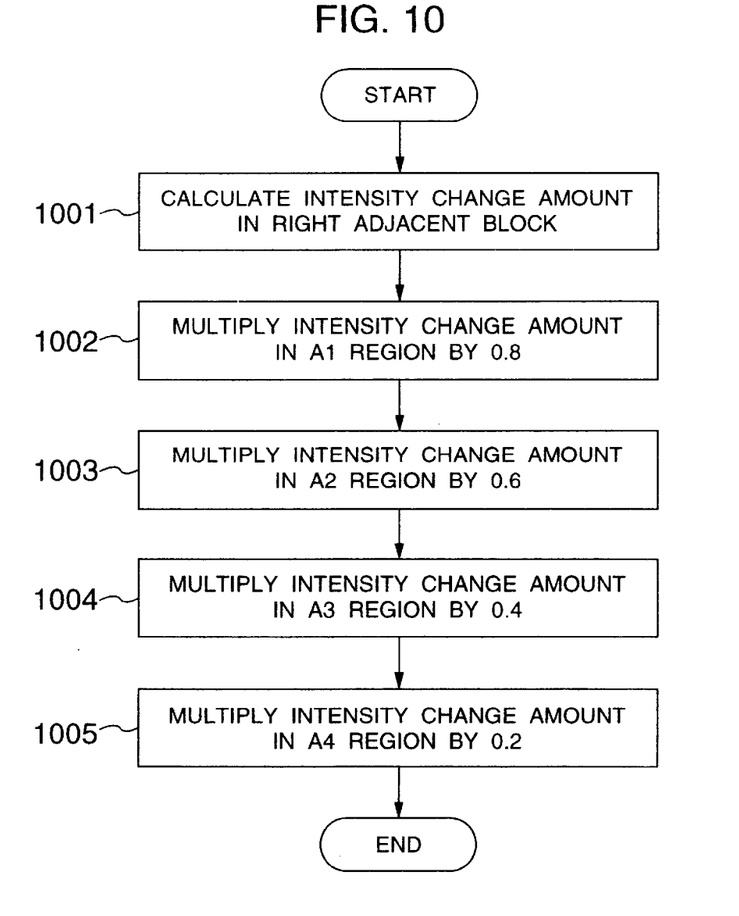
FIG. 10 is a flowchart for explaining another intensity value changing process.

FIG. 10 is a flowchart for a changing process of the intensity values of the regions 92 to 95. For simplicity of explanation, the change of the intensity values of the four (8×2) partial regions (A1, A2, A3, A4) 92 to 95 shown in FIG. 9 will now be considered.

In step 1001, attention is paid to the right adjacent block of the watermark inserting block 91 and the change amount of the intensity value of this portion is obtained. In step 1002, the intensity value change amount calculated in step 1001 is multiplied by 0.8 and the resultant value is added to the intensity value of the A1 region 92. In step 1003, the intensity value change amount is similarly multiplied by 06 and the resultant value is added to the intensity value of the A2 region 93. In step 1004, the intensity value change amount is similarly multiplied by 0.4 and the resultant value is added to the intensity value of the A3 region 94. In step 1005, the intensity value change amount is similarly multiplied by 0.2 and the resultant value is added to the intensity value of the A4 region 95. The changing process of the intensity value is finished.

In this example, although the regions which are provided around the watermark inserting block 91 have been formed by dividing one block into four portions, the invention is not limited to this method. Various modifications such that more blocks are divided into more regions and the intensity value is more smoothly changed and the like are possible.

In each of the above embodiments, although the intensity of the pixel has been changed as a method of embedding the information, the invention is not limited to this method. The information embedding method can be also realized by changing a value of any one of three primary colors constructing each pixel or values of an arbitrary combination thereof or by changing a value of either one of or an arbitrary combination of the intensity and the color differences or values of an arbitrary combination thereof.

The invention can be also applied to, for example, music other than the image. For example, a changeable range of a sound volume, a tone quality, or the like is obtained and it is changed within such a range. It is also possible to construct in a manner such that information is embedded by changing a sound volume, a tone quality, or the like on a small section unit basis and the value is also changed little by little at positions before and after the small section, thereby making it inconspicuous.

The information embedded by the above method cannot be removed by persons except for the person who knows the embedding method (position, pattern) or the information for detection and removal. On the contrary, since the person who knows the embedding method and the information for detection and removal can extract the embedded information in accordance with the invention, the invention is suitable to manage copyright information or the like of the contents.

According to the invention, in the information embedding to the contents, since the contents can be changed as much as possible within the range where the contents do not degrade, both of the prevention of the degradation and the survivability of the embedding information can be accomplished.

What is claimed is:

1. An image processing method of embedding information into an image by changing a value of a predetermined pixel included in the image, comprising the steps of:
    (1) determining a direction of a vector using said predetermined pixel and pixels surrounding said predetermined pixel;
    (2) performing image processing on said predetermined pixel and pixels along said direction;
    (3) obtaining a difference, as to said predetermined pixel, between a value before said image processing and a value after said image processing;
    (4) setting a plurality of predetermined pixels;
    (5) performing steps (1) to (3) on each of said plurality of predetermined pixels set in step (4);
    (6) determining a value of change amount of each of said predetermined pixels based on differences obtained in step (5) and a predetermined value;
    (7) performing steps (4) to (6) for respective bits in information to be embedded;
    (8) changing pixel values based on the determined change amounts; and
    (9) outputting the image in which pixel values are changed.

2. A storage device readable by a computer, embodying a program of instructions executable by the computer to perform image processing for embedding information into an image, said program when executed causes the computer to perform the steps of:
    (1) determining a direction of a vector based on a degree of change of values in a predetermined pixel and pixels surrounding said predetermined pixel;
    (2) performing image processing along said direction; and
    (3) obtaining a difference, as to said predetermined pixel, between a value before said image processing and a value after said image processing;
    (4) setting a plurality of predetermined pixels;
    (5) performing steps (1) to (3) on each of said plurality of predetermined pixels set in step (4);
    (6) determining a value of a change amount of each of said predetermined pixels based on differences obtained in step (5) and a predetermined value;
    (7) performing steps (4) to (6) for respective bits in information to be embedded;
    (8) changing pixel values based on the determined change amounts; and
    (9) outputting the image in which pixel values are changed.

3. An image processing method of embedding information into an image by changing a value of a predetermined pixel included in the image, comprising the steps of:
    (1) determining a direction of a vector using said predetermined pixel and pixels surrounding said predetermined pixel;
    (2) performing image processing on said predetermined pixel and pixels along said direction;
    (3) obtaining a difference, as to said predetermined pixel, between a value before said image processing and a value after said image processing;
    (4) setting a plurality of predetermined pixels;
    (5) performing steps (1) to (3) on each of said plurality of predetermined pixels set in step (4); and
    (6) determining a value of change amount of each of said predetermined pixels based on differences obtained in step (5) and a predetermined value,
    wherein said method satisfies at least one of conditions:
    (a) that the determination in step (1) is performed based on respective degrees of change of values along a direction of a vectors passing through said predetermined pixel,
    (b) that the image processing of step (2) is a smoothing process, and
    (c) that a change amount of step (6) is determined to be less than an upper limit value set as said predetermined value, and
    wherein the predetermined status in said step (1) is that the change of pixel values along a direction of a vector passing through said predetermined pixel is the smallest among changes of pixel values along directions of vectors passing through said predetermined pixel.

4. An image processing method according to claim 3, wherein said pixel value is an intensity value.

5. An image processing method of embedding information into an image by changing a value of a predetermined pixel included in the image, comprising the steps of:
    (1) determining a direction of a vector using said predetermined pixel and pixels surrounding said predetermined pixel,
    wherein said direction is determined based on said predetermined pixel and said pixels surrounding said predetermined pixel;
    (2) performing image processing on said predetermined pixel and pixels along said direction;
    (3) obtaining a difference, as to said predetermined pixel, between a value before said image processing and a value after said image processing; and
    (4) determining whether the value of said predetermined pixel is to be changed or not in accordance with the difference obtained in step (3).

6. An image processing method of embedding information into an image by changing a value of a predetermined pixel included in the image, comprising the steps of:
    (1) determining a direction of a vector using said predetermined pixel and pixels surrounding said predetermined pixel,
    wherein said direction is determined based on said predetermined pixel and said pixels surrounding said predetermined pixel, (2) performing image processing on said predetermined pixel and pixels along said direction;

(3) obtaining a difference, as to said predetermined pixel, between a value before said image processing and a value after said image processing;

(4) setting a plurality of predetermined pixels;

(5) performing steps (1) to (3) on each of said plurality of predetermined pixels set in step (4);

(6) determining a value of change amount of each of said predetermined pixels based on differences obtained in step (5) and a predetermined value; and (7) selecting the pixel wherein the value of the pixel is to be changed from said plurality of predetermined pixels using the change amounts obtained in step (6).

7. An article of manufacture comprising:

a computer usable medium having a computer readable program code which includes a network-distributed program, said computer readable program code being embodied in said computer usable medium for causing image processing for embedding information into an image, said computer readable program code in said article of manufacture comprising:

computer readable program code for determining a direction of a vector based on a degree of change of values in a predetermined pixel end pixels surrounding said predetermined pixel;

computer readable program code for performing image processing along said direction;

computer readable program code for obtaining a difference, as to said predetermined pixel, between a value before said image processing and a value after said image processing;

computer readable program code for setting a plurality of predetermined pixels;

computer readable program code for performing said determining a direction, said image processing and said obtaining operations on each of said plurality of predetermined pixels set in said setting operation;

computer readable program code for determining a value of a change amount of each of said predetermined pixels based on differences obtained in said operation of performing said determining a direction, said image processing and obtaining operations and a predetermined value;

computer readable program code for performing said setting, said determining a direction, said image processing, said obtaining a difference and said determining a value computer readable program codes for respective bits in information to be embedded;

computer readable program code for changing pixel values based on the determined change amounts; and computer readable program code for outputting the image in which pixel values are changed.

* * * * *